United States Patent [19]

D'Aquino

[11] Patent Number: 4,811,515
[45] Date of Patent: Mar. 14, 1989

[54] SELF-PROPELLED FISHING DEVICE

[76] Inventor: Anthony A. D'Aquino, R.D. 1, 317A, Cipriano Rd., Clintondale, N.Y. 12515

[21] Appl. No.: 82,295

[22] Filed: Aug. 6, 1987

[51] Int. Cl.$^4$ ............................................. A01K 85/06
[52] U.S. Cl. ...................................... 43/26.1; 43/26.2
[58] Field of Search ............................. 43/26.1, 26.2

[56] References Cited

U.S. PATENT DOCUMENTS

| | | | |
|---|---|---|---|
| 2,854,776 | 10/1958 | Van Sant | 43/26.2 |
| 2,955,375 | 10/1960 | Mitchell | 43/26.2 X |
| 3,099,099 | 7/1963 | Cahen et al. | 43/26.2 |
| 3,203,131 | 8/1965 | Myers | 43/26.1 |
| 3,618,254 | 11/1971 | Myers | 43/26.1 |
| 3,739,516 | 6/1973 | Holling | 43/26.1 |
| 3,758,975 | 9/1973 | Curtis | 43/26.1 |

FOREIGN PATENT DOCUMENTS

| | | | |
|---|---|---|---|
| 764665 | 8/1967 | Canada | 43/26.2 |
| 445186 | 2/1968 | Switzerland | 43/26.2 |

OTHER PUBLICATIONS

Field and Stream, Dec. 1961, p. 85.

Primary Examiner—Nicholas P. Godici
Assistant Examiner—Carmine Cuda
Attorney, Agent, or Firm—Irving M. Weiner; Pamela S. Burt; Roland W. Norris

[57] ABSTRACT

A self-propelled fishing device for connection between a line of a fishing pole and a line of a fishing lure. The device includes a submersible waterproof body capable of pulling the fishing lure in a trolling manner while submerged below the surface of the water.

8 Claims, 1 Drawing Sheet

SELF-PROPELLED FISHING DEVICE

BACKGROUND OF THE INVENTION

1. Field of the Invention

The present invention relates generally to a self-propelled fishing device for attachment between a fishing line of a fishing pole and a line of a fishing lure so as to propel the lure through water in a trolling manner.

More particularly, the invention relates to a self-propelled fishing device having a submersible waterproof body housing an electric motor for driving a propeller which propels the device and the lure attached thereto through the water, the device being propelled in a submerged state below the surface of a body of water.

2. Description of Relevant Art

One of the problems facing fishermen is the repetitive casting and reeling-in required to keep a fishing lure in motion so as to entice fish. Although this problem is alleviated when a fishing line can be trolled from the back of a moving boat, it can prove quite tiresome for the relatively stationary fisherman positioned on shore or in a stationary boat.

Various attempts have been made to overcome the foregoing problem by providing self-powered fishing devices for imparting a trolling action to the lure. The following devices are illustrative of such attempts.

U.S. Pat. No. 3,099,099 issued in 1963 to Cahen et al discloses a self-propelled fishing device resembling a miniature boat which rides on the surface of the water, pulling the lure therebehind.

U.S. Pat. No. 3,203,131 issued in 1965 to Myers discloses a self-propelled fishing device which is waterproof, and has a steering rudder thereof adapted for operative connection to the fishing line. The device is designed to lose its propellant upon being pulled by a fish or fishing line.

U.S. Pat. No. 3,618,254 issued in 1971 to Myers discloses a propeller-driven fishing device powered by solar cells, and provided with a sail which provides steerability and stability.

U.S. Pat. No. 3,739,516 issued in 1973 to Holling discloses a miniature propeller-driven boat for pulling a lure through the water.

U.S. Pat. No. 3,758,975 issued in 1973 to Curtis discloses a bobber device driven by a propeller for trolling a fishing line having a float.

The present invention overcomes various disadvantages associated with the aforesaid prior devices by providing a self-propelled fishing device of a simplified structure which is designed to be submersible, and which is powered in an effective manner.

According to the invention, there is provided a self-propelled fishing device having a submersible waterproof body with a streamlined shape, such as a submarine shape. Connecting means are provided for connecting the submersible body between a fishing line of a fishing pole and a fishing lure line. In a preferred embodiment, the submersible body is connected at its front end to the fishing pole line, and at its rear end to the lure line. Power drive means for propelling the device are at least partially housed in the submersible body and are adapted to propel the device through water.

It is an object of the invention to provide power drive means preferably including an electric motor driven by both a hearing-aid type battery (or other similar small battery) and a photoelectric cell mounted along a surface portion of the submersible body.

A further object of the invention is to provide a self-propelled fishing device provided with means for adjusting the steering angle thereof. Such means may take the form of an adjustable steering rudder provided at a lower portion of the submersible body. The rudder is in the shape of a fin and is manually rotatable about a vertical axis to adjust the steering angle of the device.

The above and further objects, details and advantages of the present invention will become apparent from the following detailed description, when read in conjunction with the accompanying drawings.

DETAILED DESCRIPTION OF PREFERRED EMBODIMENTS

Figure 1:
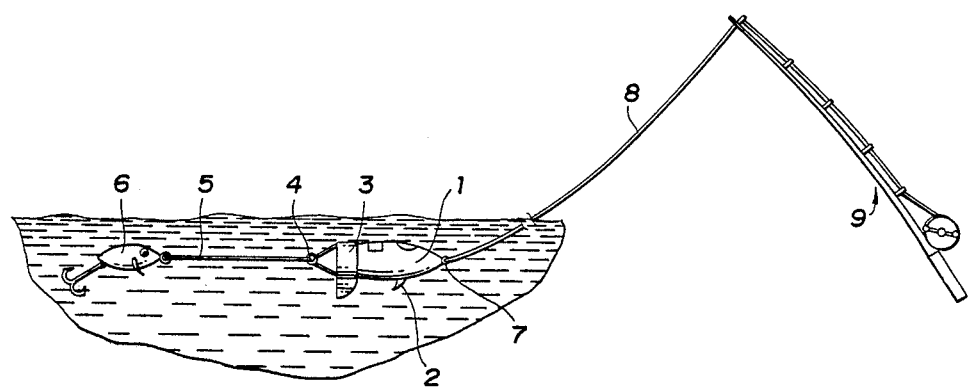
FIG. 1 is a side elevational view of the selfpropelled fishing device according to the invention, in a submerged and propelled state.

With reference to FIG. 1, there is shown a self-propelled fishing device according to a preferred embodiment of the invention, as submerged in an operable condition in a body of water. The fishing device includes a submersible waterproof body 1 preferably formed of plastic, or another suitable material such as wood or rubber.

The submersible body 1 is shown as being substantially submarine-shaped, and in this respect it will be understood that the submersible body 1 should have a streamlined shape. However, the submersible body 1 is not limited to a submarine shape, and instead may be formed in the shape of a fish or other desirable shape having a generally streamlined configuration to permit smooth movement through water when the device is in a submerged state.

The submersible body 1 has affixed thereto at a lower intermediate portion thereof a fin-shaped steering rudder 2, which also may be formed of plastic or other suitable material. The steering rudder 2 is attached to submersible body 1 in a manner which permits manual pivoting thereof about a vertical axis (in FIG. 1). Steering rudder 2 is attached such that, upon manual pivoting thereof to the desired steering angle, rudder 2 will remain in such desired position until again manually adjusted. Any suitable attachment means, such as a snug-fitting pivot pin, may be used to effect such connection of steering rudder 2 to submersible body 1.

By manually adjusting steering rudder 2, the fisherman can selectively alter the path of submersible body 1 through the water, and can select a straight path or a curved one as desired.

Extending rearwardly from submersible body 1 is a propeller protector 3, which also may be formed of plastic, for example, and may be integrally molded with submersible body 1 or otherwise suitably attached thereto. Propeller protector 3 is substantially cylindrically shaped, and circumferentially surrounds the propeller means of the device, as will be described in greater detail hereinbelow with reference to FIG. 2. As such, propeller protector 3 effectively protects the propeller means from seaweed or other matter in the water.

Trail line connecting means 4 in the form of an eyelet is secured to propeller protector 3, by means of line or other suitable attachment means, so as to extend rearwardly from protector 3. A fishing lure line 5 of a fishing lure 6 is attached to trail eyelet 4. It will be understood that lure line 5 may be of any desired length, while the fishing lure 6 may be of any desired configuration, such as a jitterbug, for example.

Attached to the forward end of submersible body 1 is lead line connecting means 7 in the form of a swivel eyelet, for example. An end of fishing line 8 of a fishing rod apparatus 9 is attached to lead eyelet 7.

Figure 2:
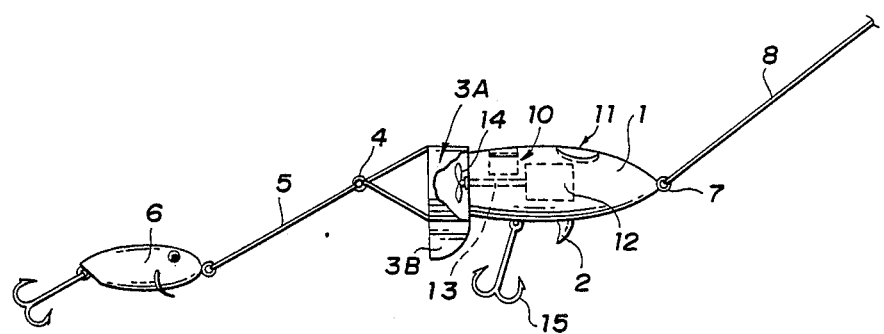
FIG. 2 is a partially cut-away side elevational view of the fishing device shown in FIG. 1, as modified to include a lower fishing hook and extended propeller protector.

With reference to FIG. 2, there is shown a modified embodiment of the fishing device according to the invention. The power drive means for propelling the device and attached lure through the water will be described with reference to FIG. 2, however, it will be understood that such description also applies to the embodiment of FIG. 1, which employs a similar power drive means.

The power drive means includes a first battery 10 which is preferably of the type commonly employed in hearing aids, i.e., it is very compact and has a relatively long life. Any other battery meeting such requirements may also be employed. The battery 10 is received within a battery compartment formed in submersible body 1, and is removably secured therein by means of a leakproof lid.

A second battery 11 comprising a photoelectric cell 11 may also be provided, preferably mounted along an upper surface portion of submersible body 1 as shown in FIG. 2 to permit the harnessing of energy from ambient radiation as an additional power source. Each of the batteries 10 and 11 is connected with an electric motor 12 housed within submersible body 1. An electric switch, such as a slide switch, may also be provided on a surface of submersible body 1 in operable connection with motor 12.

Extending rearwardly from electric motor 12 is output means thereof, in the form of an output shaft 13 or any other desired drive shaft arrangement such as a combination output shaft/propeller shaft arrangement. Shaft 13 extends to the rear end of submersible body 1 and supports a propeller 14 at the end thereof, with propeller 14 being positioned outside the rear surface of submersible body 1.

The propeller protector 3A shown in FIG. 2 substantially circumferentially surrounds propeller 14 in the same manner as protector 3 of FIG. 1, and further includes a downwardly extending portion 3B. An optional fishing hook 15 may be attached to a lower surface portion of submersible body 1, such as by means of a swivel eyelet. When hook 15 is thus employed, the downward extension 3B of protector 3 will function to prevent hook 15 from trailing too far rearwardly.

Operation of the fishing device in accordance with the invention will now be described with reference to FIGS. 1 and 2.

First, the device is secured in operative position between the fishing line 8 of fishing pole 9 and the line 5 of fishing lure 6 as shown in FIGS. 1 and 2 and described hereinabove. Next, the angle of steering rudder 2 is manually adjusted as desired. Electric motor 12 is then activated, and the device is placed in the water.

Once in the water, the submersible body 1 will be submerged below the surface of the water as shown in FIG. 1. The propeller 14 driven by electric motor 12 will then propel the device, with the fishing lure 6 attached therethrough, through the water in a trolling fashion. The fisherman is thus prevented from having to apply a manual pulling action to lure 6, and instead may hold fishing pole 9 relatively stationary while the device propels the lure through the water.

From the foregoing it will be understood that the submersible waterproof body 1 tends to remain substantially submerged below the surface of the water. In this respect, the device is suitably dimensioned, and the weight of the component parts thereof (particularly motor 12) is suitably selected, such that submersible body 1 will tend to remain substantially submerged. To further serve this end, the fisherman may optionally attach suitable commonly-available fishing weights or sinkers (not shown), to one of the eyelets or between body 1 and hook 15, if desired. In this manner, the relative depth at which the submersible body 1 will remain submerged can be selectively determined.

While there have been described what are at present considered to be the preferred embodiments of the invention, it will be understood that many changes and modifications may be made therein without departing from the scope of the appended claims.

I claim:

1. A self-propelled fishing device comprising:
   a submersible waterproof body adapted to be propelled in a submerged state below the surface of a body of water;
   power drive means for propelling said device, said power drive means including:
      an electric motor sealably mounted within said submersible body, said electric motor including output means extending to a rear surface of said submersible body;
      a propeller mounted on an output shaft of said output means, outside said rear surface of said submersible body; and
      battery means located in a separate, sealed chamber, operatively connected with said electric motor to selectively drive same;
   said submersible waterproof body including swiveling connecting means for connecting said submersible body between a fishing line of a fishing pole and a lure line; and
   a single steering rudder mounted in a lower portion of said submersible body.

2. A self-propelled fishing device according to claim 1, wherein:
   said submersible body is formed with a battery compartment adjacent an outer surface portion thereof, said compartment being provided with an access opening selectively opened and closed by a leakproof lid member.

3. A self-propelled fishing device according to claim 1, wherein:
   said battery means comprises a photoelectric cell mounted along a surface portion of said submersible body.

4. A self-propelled fishing device according to claim 1, wherein:
   said single steering rudder comprises a fin-shaped member affixed to a lower intermediate surface portion of said submersible body so as to be manually rotatable about a vertical axis to adjust the steering angle of said device.

5. A self-propelled fishing device according to claim 1, wherein:

a propeller protector extends from a rear portion of said submersible body and circumferentially around said propeller, with the lower portion of the protector elongated downwardly to prevent hooks mounted on the undersurface from trailing too far to the rear.

6. A self-propelled fishing device according to claim 1, wherein:

a lower portion of said submersible body is provided with swiveling attachment means for securing a fishing hook thereto.

7. A self-propelled fishing device according to claim 1, wherein:

said submersible body is formed with a battery compartment located on a surface portion of the device and sealably separate from said motor so as to be a separate waterproof chamber;

said battery means comprises a small hearing-aid type battery removably disposed in said battery compartment; and said battery means further comprises a photoelectric cell mounted along a surface portion of said submersible body.

8. A self-propelled fishing device according to claim 7, wherein:

said line connecting means comprises a lead eyelet attached to the forwardmost portion of said submersible body for connection to a fishing line of a fishing pole and a trail eyelet suspendably attached to the propeller protector portion of said submersible body for connection to a lure line.

* * * * *